United States Patent [19]

Hendi

[11] Patent Number: 5,827,364
[45] Date of Patent: Oct. 27, 1998

[54] PIGMENT COMPOSITIONS

[75] Inventor: Shivakumar Basalingappa Hendi, Newark, Del.

[73] Assignee: Ciba Specialty Chemicals Corporation, Tarrytown, N.Y.

[21] Appl. No.: 804,306

[22] Filed: Feb. 21, 1997

[51] Int. Cl.$^6$ .............................. C09C 48/00; C09C 67/50
[52] U.S. Cl. ............... 106/495; 106/31.75; 106/31.76; 106/31.77; 106/31.78; 106/493; 106/494; 106/497; 106/498; 106/413
[58] Field of Search ............................ 106/493, 494, 106/495, 497, 498, 31.75, 31.76, 31.77, 31.78, 413

[56] References Cited

U.S. PATENT DOCUMENTS

| | | | |
|---|---|---|---|
| 3,275,637 | 9/1966 | West | 106/495 |
| 4,256,507 | 3/1981 | Kranz et al. | 106/495 |
| 4,451,398 | 5/1984 | Patsch et al. | 534/752 |
| 5,137,576 | 8/1992 | Macholdt et al. | 106/495 |
| 5,334,727 | 8/1994 | Campbell | 548/373.1 |

FOREIGN PATENT DOCUMENTS

| | | |
|---|---|---|
| 0362703 | 4/1990 | European Pat. Off. |
| 0485337 | 5/1992 | European Pat. Off. |
| 0500494 | 8/1992 | European Pat. Off. |

OTHER PUBLICATIONS

Derwent Abst. 94-283483|35 |.
Derwent Abst. 86-241040 |25 |.

Primary Examiner—Mark L. Bell
Assistant Examiner—Scott L. Hertzog
Attorney, Agent, or Firm—Kevin T. Mansfield

[57] ABSTRACT

Pigment compositions comprising a pigment and both a phthalimidomethylquinacridone and a pyrazolylmethylquinacridone as additives are disclosed. The disclosed pigment compositions are useful for coloring coating compositions. Coating composition colored with the inventive pigment compositions have excellent rheological characteristics and which yield coatings having excellent saturation.

20 Claims, No Drawings

PIGMENT COMPOSITIONS

SUMMARY

The present invention relates to pigment compositions which have improved rheology characteristics when dispersed and which are used to prepare coating compositions which yield coatings having enhanced saturation. The inventive pigment compositions contain a phthalimidomethylquinacridone and a pyrazolylmethylquinacridone as additives in addition to the pigment.

BACKGROUND

It is known in the art that the inclusion of certain pigment derivatives in pigment compositions serves to control and/or improve a variety of properties of dispersions containing the pigment composition. The beneficial effects of the presence of pigment derivatives are especially observed in properties such as color strength, hue, gloss, transparency, rheology, deflocculation and the like.

For example, U.S. Pat. No. 5,334,727 discloses pyrazolylmethyl derivatives of pigments, including pyrazolylmethylquinacridone, that are used to impart excellent rheological and tinctoral properties to finished or semifinished pigment compositions. U.S. Pat. No. 5,334,727 also discloses that such pyrazolylmethyl pigment derivatives are advantageously combined with sulfonated pigment derivatives in pigment compositions for beneficial effects over and above those observed for the individual pyrazolylmethyl or sulfonated pigment derivative.

U.S. Pat. No. 3,275,637 discloses o-carboxybenzamidomethylquinacridone compounds which are used in pigment compositions as rheology improving agents, and in preparatory processes as particle growth inhibitors. The o-carboxybenzamidomethylquinacridone compounds are partial hydrolysis products of the phthalimidomethylquinacridone compounds used according to the present invention and are considered to be equivalents thereof.

The present invention relates to the discovery that the presence of both a phthalimidomethylquinacridone derivative and a pyrazolylmethylquinacridone derivative in a pigment composition that is dispersed unexpectedly results in a reduction in viscosity which is greater than could have been expected based on the prior art. The present invention further relates to the discovery that the incorporation of both a phthalimidomethylquinacridone derivative and a pyrazolylmethylquinacridone derivative into a coating composition unexpectedly results in a coating that has improved saturation.

DETAILED DESCRIPTION

The present invention relates to a pigment composition which comprises a pigment, a first quinacridone derivative and a second quinacridone derivative wherein the first quinacridone derivative is a phthalimidomethylquinacridone of the formula

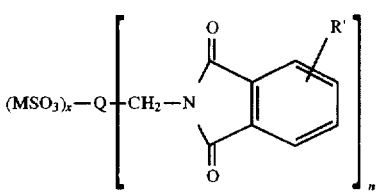

or a o-carboxybenzamidomethylquinacridone partial hydrolysis product thereof, and the second quinacridone derivative is a pyrazolylmethylquinacridone of the formula

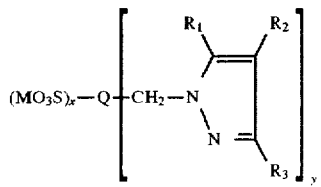

in which formulae

Q is a quinacridone radical,

R' is hydrogen, halogen, or C1–C4alkyl,

R1, R2, and R3 are independently, hydrogen, halogen, unsubstituted C1–C18alkyl, C1–C18alkyl which is substituted by one or more halogen or C1–C6alkoxy groups, unsubstituted C6–C10 aryl, C6–C10 aryl which is substituted by one or more C1–C18alkyl, halogen, nitro or C1–C6alkoxy groups, or R1 and R2 together with the carbons of the pyrazole ring form part of a fused alicyclic, aromatic or heterocyclic ring, M is hydrogen, a quaternary ammonium cation, or a metal cation, n is 1, 2, 3 or 4, x is a number from 0 to 2, and y is 1 ,2, 3 or 4.

Preferably, R' is hydrogen, chlorine or methyl.

Especially useful pigment compositions are those wherein R2 is hydrogen and R1 and R3 are methyl, in particular those wherein R' is hydrogen, chlorine or methyl, especially hydrogen.

The pigment is any pigment, such as a phthalocyanine, indanthrone, isoindolone, isoindoline, flavanthrone, pyranthrone, anthraquinone, thioindigo, perylene pigment, or preferably a 1,4-diketopyrrolopyrrole or quinacridone pigment, especially a quinacridone pigment. The pigment is also a solid solution containing a quinacridone or 1,4-diketopyrrolopyrole pigment, for example, a solid solution composed of only two or more quinacridone or 1,4-diketopyrrolopyrrole pigments, a solid solution composed of one or more quinacridone pigments and one or more 1,4-diketopyrrolopyrrole pigments, or a solid solution composed of one or more quinacridone pigments and/or one or more 1,4-diketopyrrolopyrrole pigments and a pigment of a different class, such as a quinacridonequinone, and/or a stabilizer, such as an anilinoacridone. Especially useful solid solutions include binary solid solutions composed of 1,4-diketo-3,6-bis(4-chlorophenyl)pyrrolo|3,4-c|pyrrole and 2,9-dichloroquinacridone and ternary solid solutions composed of 1,4-diketo-3,6-diphenylpyrrolo|3,4-c|pyrrole, 1,4-diketo-3,6-bis(4-chlorophenyl)pyrrolo|3,4-c|pyrrole and 2,9-dichloroquinacridone.

In general, the quinacridone radicals, Q, are of the formula

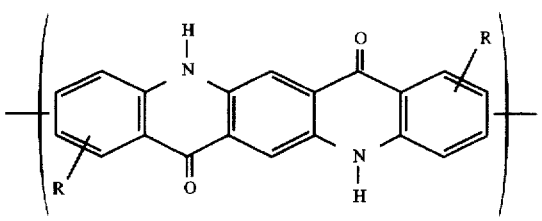

wherein each R is independently hydrogen or a substituent, such as halogen or unsubstituted or substituted C1–C4alkyl. In particular, R is hydrogen, chlorine or methyl. The quinacridone radical present in the phthalimidomethylquinacridone and the pyrazolylmethylquinacridone are the same or different, especially the same. In a preferred embodiment, both R substituents in each Q group are the same. Preferred quinacridone radicals are derived from quinacridone, 2,9-dichloroquinacridone, 4,11-dichloroquinacridone, 2,9-dimethylquinacridone and 4,11-dimethylquinacridone Preferably, the pigment is a quinacridone, a 1,4-diketopyrrolopyrrole or a solid solution thereof.

In a particular embodiment, the pigment is a quinacridone or 1,4-diketopyrrolopyrrole, or solid solution thereof, and R' is hydrogen, R2 is hydrogen and R1 and R3 are methyl.

Quinacridone, 2,9-dichloroquinacridone, 4,11-dichloroquinacridone, 2,9-dimethylquinacridone, 4,11-dimethylquinacridone, 2,9-difluoroquinacridone, and solid solutions thereof, are important quinacridone pigments in the present pigment compositions.

1,4-diketo-3,6-diphenylpyrrolo[3,4-c]pyrrole, 1,4-diketo-3,6-bis(4-methylphenyl)pyrrolo[3,4-c]pyrrole, 1,4-diketo-3,6-bis(tert-butylphenyl)pyrrolo[3,4-c]pyrrole, 1,4-diketo-3,6-bis(4-chlorophenyl)pyrrolo[3,4-c]pyrrole, 1,4-diketo-3,6-bis(4-biphenylyl)pyrrolo[3,4-c]pyrrole, 1,4-diketo-3,6-bis(3- or 4-cyanophenyl)pyrrolo[3,4-c]pyrrole, 1,4-diketo-3,6-bis(3,4-dichlorophenyl)pyrrolo[3,4-c]pyrrole, and solid solutions thereof, are important 1,4-diketopyrrolopyrrole pigments present in the inventive pigment compositions. The 1,4-diketopyrrolopyrrole pigments are also commonly named as 3,6-diaryl-1,4-diketopyrrolo[3,4-c]pyrroles or 1,4-diketo-3,6-diaryl-2,5-dihydropyrrolo[4,3-c]pyrroles.

In general, the pigment compositions contain up to about 15 percent by weight of the mixture of quinacridone derivatives, based on the weight of the pigment composition. Preferably, the pigment compositions contain from 0.1 to 12 percent by weight of the first quinacridone derivative and from 0.1 to 12 percent by weight of the second quinacridone derivative for a total of up to 15 percent by weight of the mixture of quinacridone derivatives, all percentages being based on the weight of the pigment composition. Most preferably, the pigment composition contains from 4 to 10 percent by weight of the mixture of quinacridone derivatives and from 2 to 8 percent of the first quinacridone derivative and from 2 to 8 percent of the second quinacridone derivative, especially approximately equal parts by weight of the first and second quinacridone derivatives.

The inventive pigment compositions are advantageously used to pigment coating compositions, especially paints. Thus, the present invention further relates to a process for preparing a coating composition which comprises incorporating an effective pigmenting amount of the pigment composition of claim 1 into the coating composition by mixing the pigment composition with the coating composition or by mixing components of the pigment composition with the coating composition. Accordingly, the inventive pigment composition is also prepared in situ.

The present invention also relates to a coating composition which comprises an effective pigmenting amount of a pigment and a mixture of quinacridone derivatives, which mixture of quinacridone derivatives consists essentially of a first quinacridone derivative and a second quinacridone derivative, wherein the first quinacridone derivative is a phthalimidomethylquinacridone of the formula

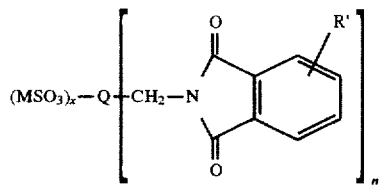

or a o-carboxybenzamidomethylquinacridone partial hydrolysis product thereof, and the second quinacridone derivative is a pyrazolylmethylquinacridone of the formula

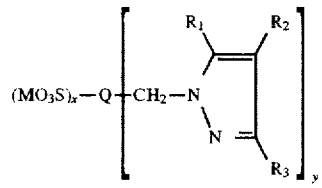

in which formulae

Q is a quinacridone radical,

R' is hydrogen, halogen, or C1–C4alkyl,

R1, R2, and R3 are independently, hydrogen, halogen, unsubstituted C1–C18alkyl, C1–C18alkyl which is substituted by one or more halogen or C1–C6alkoxy groups, unsubstituted C6–C10 aryl, C6–C10 aryl which is substituted by one or more C1–C18alkyl, halogen, nitro or C1–C6alkoxy groups, or R1 and R2 together with the carbons of the pyrazole ring form part of a fused alicyclic, aromatic or heterocyclic ring, M is hydrogen, a quaternary ammonium cation, or a metal cation, n is 1, 2 or 3, x is a number from 0 to 2, and y is 1, 2, 3 or 4.

All of the preferences discussed above with regard to the pigment compositions also apply to the inventive coating compositions.

Especially useful coating compositions are those wherein the pigment is a quinacridone pigment, such as quinacridone, 2,9-dichloroquinacridone, 4,11-dichloroquinacridone, 2,9-dimethylquinacridone, 4,11-dimethylquinacridone, or 2,9-difluoroquinacridone, or a diketopyrrolopyrrole, such as 1,4-diketo-3,6-diphenylpyrrolo[3,4-c]pyrrole, 1,4-diketo-3,6-bis(4-methylphenyl)pyrrolo[3,4-c]pyrrole, 1,4-diketo-3,6-bis(tert-butylphenyl)pyrrolo[3,4-c]pyrrole, 1,4-diketo-3,6-bis(4-chlorophenyl)pyrrolo[3,4-c]pyrrole, 1,4-diketo-3,6-bis(4-biphenylyl)pyrrolo[3,4-c]pyrrole, 1,4-diketo-3,6-bis(3- or 4-cyanophenyl)pyrrolo[3,4-c]pyrrole, or 1,4-diketo-3,6-bis(3,4-dichlorophenyl)pyrrolo[3,4-c]pyrrole, or a solid solution thereof.

Particularly useful coating compositions are those wherein R' is hydrogen, R2 is hydrogen and R1 and R3 are methyl.

In a preferred embodiment, the coating composition is based on an alkyd/melamine, acrylic/melamine, acryliclurethane resin or a thermosetting or thermoplastic acrylic resin.

Most preferably, the coating composition is a paint, especially an automotive paint.

The present invention further relates to a process for improving the rheology characteristics of a pigment dispersion, which comprises incorporating an effective viscosity-reducing amount of a mixture of quinacridone derivatives into the pigment dispersion, wherein the mixture of quinacridone derivatives consists essentially of a first quinacridone derivative and a second quinacridone derivative wherein the first quinacridone derivative is a phthalimidomethylquinacridone of the formula

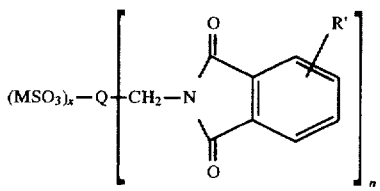

or a o-carboxybenzamidomethylquinacridone partial hydrolysis product thereof, and the second quinacridone derivative is a pyrazolylmethylquinacridone of the formula

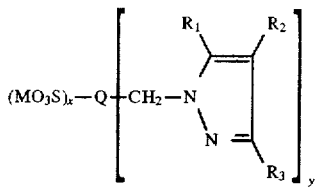

in which formulae

Q is a quinacridone radical,

R' is hydrogen, halogen, or C1–C4alkyl,

R1, R2, and R3 are independently, hydrogen, halogen, unsubstituted C1–C18alkyl, C1–C18alkyl which is substituted by one or more halogen or C1–C6alkoxy groups, unsubstituted C6–C10 aryl, C6–C10 aryl which is substituted by one or more C1–C18alkyl, halogen, nitro or C1–C6alkoxy groups, or R1 and R2 together with the carbons of the pyrazole ring form part of a fused alicyclic, aromatic or heterocyclic ring, M is hydrogen, a quaternary ammonium cation, or a metal cation, n is 1, 2, 3 or 4, x is a number from 0 to 2, and y is 1, 2, 3 or 4.

An unexpected advantage of the present coating compositions is that the saturation of coatings prepared from such coating compositions is enhanced. Saturation is readily measured according to the CIE LAB system as the A component. In general, the present coating compositions yield coatings having a higher value for the saturation component, A, in the CIE LAB measurement system. Preferably, the color of coatings having improved saturation is violet, magenta, blue-shade red, yellow-shade red or orange.

Thus, the present invention further relates to a process for enhancing the saturation of a coating, which comprises incorporating an effective saturation-enhancing amount of a mixture of quinacridone derivatives into the coating, wherein the mixture of quinacridone derivatives consists essentially of a first quinacridone derivative and a second quinacridone derivative wherein the first quinacridone derivative is a phthalimidomethylquinacridone of the formula

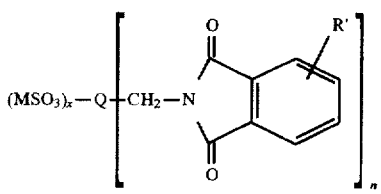

or a o-carboxybenzamidomethylquinacridone partial hydrolysis product thereof, and the second quinacridone derivative is a pyrazolylmethylquinacridone of the formula

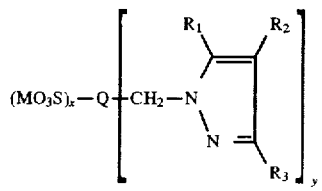

in which formulae

Q is a quinacridone radical,

R' is hydrogen, halogen, or C1–C4alkyl,

R1, R2, and R3 are independently, hydrogen, halogen, unsubstituted C1–C18alkyl, C1–C18alkyl which is substituted by one or more halogen or C1–C6alkoxy groups, unsubstituted C6–C10 aryl, C6–C10 aryl which is substituted by one or more C1–C18alkyl, halogen, nitro or C1–C6alkoxy groups, or R1 and R2 together with the carbons of the pyrazole ring form part of an alicyclic, aromatic or heterocyclic ring, M is hydrogen, a quaternary ammonium cation, or a metal cation, n is 1, 2, 3 or 4, x is a number from 0 to 2, and y is 1, 2, 3 or 4.

The following examples further illustrate, but do not limit, the scope of the invention. All parts are parts by weight unless otherwise identified.

EXAMPLE 1

4.0 grams of 1,4-diketo-3,6-bis(4-chlorophenyl) pyrrolopyrrole, 6.0 grams of 2,9-dichloroquinacridone, 1 gram of dimethyl glutarate, 0.5 grams of surfactant and 40.0 grams of Al2SO4·15–18 H2O are added to a 1 liter ball mill containing steel balls and nails as grinding media. After the mill is rolled for 24 hours, the contents are discharged and separated from the milling media. The resulting mill powder is stirred with 2% aqueous sulfuric acid for two hours at 90° C. The resulting slurry is filtered and washed with hot water until neutral and free of salts.

EXAMPLE 2

92 parts of the presscake prepared according to Example 1 is wet blended with 4 parts of pyrazolylmethylquinacridone and 4 parts of quinacridone sulfonic acid and then dried. 16.5 grams of the resulting blend is combined with 41.2 grams of acrylourethane resin, 0.9 grams of dispersant resin and 98.3 grams of thinner. The resulting blend is milled for 64 hours using 980 grams of grinding media to yield a pigment base containing 10% pigment and 30% solids at a pigment to binder ratio of 0.5.

EXAMPLE 3

93 parts of the presscake prepared according to Example 1 is wet blended with 4 parts of pyrazolylmethylquinacridone and 3 parts of phthalimidomethylquinacridone and dried. 16.5 grams of the resulting blend is combined with 41.2 grams of acrylourethane resin, 0.9 grams of dispersant resin and 98.3 grams of thinner. The resulting blend is milled for 64 hours using 980 grams of grinding media to yield a pigment base containing 10% pigment and 30% solids at a pigment to binder ratio of 0.5.

EXAMPLE 4

The viscosity of the pigment bases prepared according to Examples 2 and 3 are determined at room temperature using a Brookfield DV-11 apparatus. The rheology profiles of the pigment bases are summarized in the following table.

| Pigment Base | 10 rpm | 20 rpm | 50 rpm |
| --- | --- | --- | --- |
| Example 2 | 480 | 410 | 328 |
| Example 3 | 360 | 310 | 260 |

EXAMPLE 5

Paint Evaluations

Aluminum Base

An aluminum base is prepared by mixing 405 grams of aluminum paste with 315 grams of acrylic dispersion resin and 180 grams of acrylic resin until lump free.

Metallic Clear Solution 1353 grams of a non-aqueous dispersion resin, 786.2 grams of a melamine resin, 144.6 grams of xylene, 65.6 grams of a UV screener solution and 471 grams of acrylourethane resin are added to a container in the order mentioned and mixed thoroughly for 15 minutes. 89.0 grams of premixed catalyst and 90.0 grams of methanol are slowly added to yield the metalic clear solution.

Metallic Paint Formulation

A basecoat paint containing 7.1% pigment and 54.4% solids with a pigment to binder ratio of 0.15 is prepared by mixing 46.8 grams of pigment base, 4.2 grams of aluminum base, 4.4 grams of nonaqueous dispersion resin and 44.6 grams of metallic clear solution.

Mica Base

A mica base is prepared by mixing 251.1 grams of Russet Mica with 315 grams of acrylic resin and 180 grams of dispersion resin until lump free.

Mica Paint Formulation

A basecoat paint is prepared by mixing 122.4 grams of pigment base, 70.2 grams of mica base, 20.8 grams of nonaqueous dispersion resin, 30.6 grams of melamine resin, 2.6 grams of UV screener and 3.5 grams of catalyst on a paint shaker for 5 minutes. The final paint is prepared by diluting with xylene to a spray viscosity of 23 seconds in a #2 Fischer cup.

Aluminum panels treated with gray primer are sprayed with two coats of basecoat paint, spaced by a 90 second flash at room temperature, to a thickness of 15–20 microns on a dry film basis. After a flash of 3 minutes, the acrylic topcoat is applied by spraying two coats to a film thickness of 37–50 microns on a dry film basis. The panels are dried for 10 minutes at room temperature and baked at 120° C. for 30 minutes.

The following table compares the color saturation of coatings prepared from the pigment base of Examples 2 and 3.

| | Delta A | |
| --- | --- | --- |
| sample | 80/20 aluminum | 50/50 mica |
| MONASTRAL BRILLIANT RED RT-380-D | control | control |
| Example 2 | 0.16 | 0.13 |
| Example 3 | 0.30 | 1.49 |

I claim:

1. A pigment composition which comprises a pigment, a first quinacridone derivative and a second quinacridone derivative wherein the first quinacridone derivative is a phthalimidomethylquinacridone of the formula $$(MSO_3)_x - Q \left[ CH_2 - N \begin{array}{c} O \\ \diagup \\ \diagdown \\ O \end{array} \bigotimes^{R'} \right]_n$$

or a o-carboxybenzamidomethylquinacridone partial hydrolysis product thereof, and the second quinacridone derivative is pyrazolylmethylquinacridone of the formula $$(MO_3S)_x - Q \left[ CH_2 - N \begin{array}{c} R_1 \\ \diagdown \\ N \end{array} \begin{array}{c} R_2 \\ = \\ R_3 \end{array} \right]_y$$

in which formulae
Q is a quinacridone radical,
R' is hydrogen, halogen, or C1–C4alkyl,
R1, R2, and R3 are independently, hydrogen, halogen, unsubstituted C1–C18alkyl, C1–C18alkyl which is substituted by one or more halogen or C1–C6alkoxy groups, unsubstituted C6–C10 aryl, C6–C10 aryl which is substituted by one or more C1–C18alkyl, halogen, nitro or C1–C6alkoxy groups, or R1 and R2 together with the carbons of the pyrazole ring form part of a fused alicyclic, aromatic or heterocyclic ring,
M is hydrogen, a quaternary ammonium cation, or a metal cation,
n is 1, 2, 3 or 4,
x is a number from 0 to 2, and
y is 1, 2, 3 or 4.

2. A pigment composition of claim 1 wherein R' is hydrogen, chlorine or methyl.

3. A pigment composition of claim 1 wherein R2 is hydrogen and R1 and R3 are methyl.

4. A pigment composition of claim 3 wherein R' is hydrogen, chlorine or methyl.

5. A pigment composition of claim 4 wherein R' is hydrogen.

6. A pigment composition of claim 1 wherein the pigment is a quinacridone, a 1,4-diketo-3,6-diarylpyrrolopyrrole or a solid solution thereof.

7. A pigment composition of claim 5 wherein the pigment is a quinacridone, a 1,4-diketo-3,6-diarylpyrrolopyrrole or a solid solution thereof.

8. A pigment composition of claim 7 wherein the pigment is selected from the group consisting of quinacridone, 2,9-dichloroquinacridone, 4,11-dichloroquinacridone, 2,9-dimethylquinacridone, 4,11-dimethylquinacridone, 2,9-difluoroquinacridone, 1,4-diketo-3,6-diphenylpyrrolo|3,4-c| pyrrole, 1,4-diketo-3,6-bis(4-methylphenyl)pyrrolo|3,4-c| pyrrole, 1,4-diketo-3,6-bis(tert-butylphenyl)pyrrolo|3,4-c| pyrrole, 1,4-diketo-3,6-bis(4-chlorophenyl)pyrrolo|3,4-c| pyrrole, 1,4-diketo-3,6-bis(4-biphenylyl)pyrrolo|3,4-c| pyrrole, 1,4-diketo-3,6-bis(3- or 4-cyanophenyl)pyrrolo|3, 4-c|pyrrole, 1,4-diketo-3,6-bis(3,4-dichlorophenyl)pyrrolo |3,4-c|pyrrole, and solid solutions thereof.

9. A pigment composition of claim 1 which comprises up to 15 percent by weight of the quinacridone derivatives, based on the weight of the pigment.

10. A pigment composition of claim 9 which comprises from 0.1 to 12 percent by weight of the first quinacridone derivative and from 0.1 to 12 percent by weight of the second quinacridone derivative based on the weight of the pigment composition.

11. A pigment composition of claim 10 which comprises from 2 to 8 percent by weight of the first quinacridone derivative and from 2 to 8 percent by weight of the second quinacridone derivative, the total amount of both derivatives being from 6 to 10 percent by weight.

12. A process for preparing a coating composition which comprises incorporating an effective pigmenting amount of the pigment composition of claim 1 into the coating composition by mixing the pigment composition with the coating composition or by mixing components of the pigment composition with the coating composition.

13. A process for improving the rheology characteristics of a pigment dispersion, which comprises incorporating an effective viscosity-reducing amount of a mixture of quinacridone derivatives into the pigment dispersion, wherein the mixture of quinacridone derivatives consists essentially of a first quinacridone derivative and a second quinacridone derivative wherein the first quinacridone derivative is of the formula

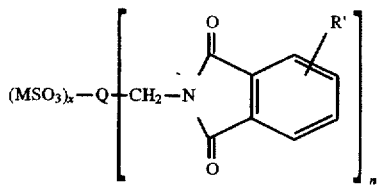

or a o-carboxybenzamidomethylquinacridone partial hydrolysis product thereof, and the second quinacridone derivative is of the formula

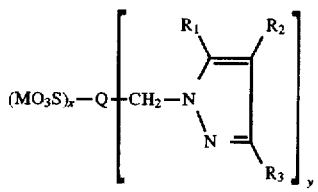

in which formulae

Q is a quinacridone radical,

R' is hydrogen, halogen, or C1–C4alkyl,

R1, R2, and R3 are independently, hydrogen, halogen, unsubstituted C1–C18alkyl, C1–C18alkyl which is substituted by one or more halogen or C1–C6alkoxy groups, unsubstituted C6–C10aryl, C6–C10 aryl which is substituted by one or more C1–C18alkyl, halogen, nitro or C1–C6alkoxy groups, or R1 and R2 together with the carbons of the pyrazole ring form part of an alicyclic, aromatic or heterocyclic ring, M is hydrogen, a quaternary ammonium cation, or a metal cation, n is 1, 2, 3 or 4, x is a number from 0 to 2, and y is 1, 2, 3 or 4.

14. A process for enhancing the saturation of a coating, which comprises incorporating an effective saturation-enhancing amount of a mixture of quinacridone derivatives into the coating, wherein the mixture of quinacridone derivatives consists essentially of a first quinacridone derivative and a second quinacridone derivative wherein the first quinacridone derivative is of the formula

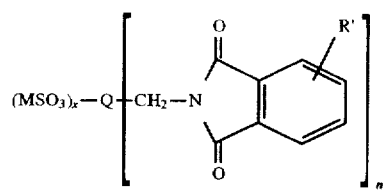

or a o-carboxybenzamidomethylquinacridone partial hydrolysis product thereof, and the second quinacridone derivative is of the formula

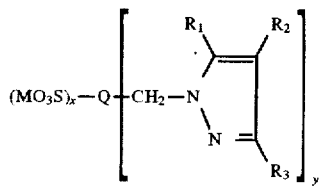

in which formulae

Q is a quinacridone radical,

R' is hydrogen, halogen, or C1–C4alkyl,

R1, R2, and R3 are independently, hydrogen, halogen, unsubstituted C1–C18alkyl, C1–C18alkyl which is substituted by one or more halogen or C1–C6alkoxy groups, unsubstituted C6–C10 aryl, C6–C10 aryl which is substituted by one or more C1–C18alkyl, halogen, nitro or C1–C6alkoxy groups, or R1 and R2 together with the carbons of the pyrazole ring form part of an alicyclic, aromatic or heterocyclic ring, M is hydrogen, a quaternary ammonium cation, or a metal cation, n is 1, 2, 3 or 4, x is a number from 0 to 2, and y is 1, 2, 3or 4.

15. A coating composition which comprises an effective pigmenting amount of a pigment and a mixture of quinacridone derivatives, which mixture of quinacridone derivatives consists essentially of a first quinacridone derivative and a second quinacridone derivative, wherein the first quinacridone derivative is of the formula

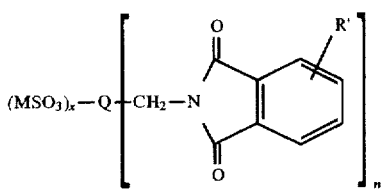

or a o-carboxybenzamidomethylquinacridone partial hydrolysis product thereof, and the second quinacridone derivative is of the formula

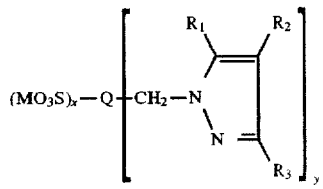

in which formulae

Q is a quinacridone radical,

R' is hydrogen, halogen, or C1–C4alkyl,

R1, R2, and R3 are independently, hydrogen, halogen, unsubstituted C1–C18alkyl, C1–C18alkyl which is substituted by one or more halogen or C1–C6alkoxy groups, unsubstituted C6–C10 aryl, C6–C10 aryl which is substituted by one or more C1–C18alkyl, halogen, nitro or C1–C6alkoxy groups, or R1 and R2 together with the carbons of the pyrazole ring form part of an alicyclic, aromatic or heterocyclic ring, M is hydrogen, a quaternary ammonium cation, or a metal cation, n is 1, 2 or 3, x is a number from 0 to 2, and y is 1, 2, 3 or 4.

16. A coating composition of claim 15 wherein the pigment is a quinacridone, a 1,4-diketo-3,6-diarylpyrrolopyrrole or a solid solution thereof.

17. A coating composition of claim 16 wherein the pigment is selected from the group consisting of quinacridone, 2,9-dichloroquinacridone, 4,11-dichloroquinacridone, 2,9-dimethylquinacridone, 4,11-dimethylquinacridone, 2,9-difluoroquinacridone, 1,4-diketo-3,6-diphenylpyrrolo[3,4-c]pyrrole, 1,4-diketo-3,6-bis(4-methylphenyl)pyrrolo[3,4-c]pyrrole, 1,4-diketo-3,6-bis(tert-butylphenyl)pyrrolo[3,4-c]pyrrole, 1,4-diketo-3,6-bis(4-chlorophenyl)pyrrolo[3,4-c]pyrrole, 1,4-diketo-3,6-bis(4-biphenylyl)pyrrolo[3,4-c]pyrrole, 1,4-diketo-3,6-bis(3- or 4-cyanophenyl)pyrrolo[3,4-c]pyrrole, 1,4-diketo-3,6-bis(3,4-dichlorophenyl)pyrrolo[3,4-c]pyrrole, and solid solutions thereof.

18. A coating composition of 17 wherein R' is hydrogen, R2 is hydrogen and R1 and R3 are methyl.

19. A coating composition of claim 15 which is based on an alkyd/melamine, acrylic/melamine, acrylic/urethane resin or a thermosetting or thermoplastic acrylic resin.

20. A paint composition comprising the coating composition of claim 15.

* * * * *

UNITED STATES PATENT AND TRADEMARK OFFICE
CERTIFICATE OF CORRECTION

PATENT NO.    : 5,827,364
DATED         : October 27, 1998
INVENTOR(S)   : Shivakumar Basalingappa Hendi It is certified that error appears in the above-identified patent and that said Letters Patent is hereby corrected as shown below:

On the title page, insert the following:

--Related U.S. Application Data
[] Provisional application No. 60/011,566 Feb. 13, 1996--.

Column 1, line 2 insert the following:

--CROSS REFERENCE TO RELATED APPLICATION
Reference is made to and priority claimed from U.S. Provisional application Ser. No. US60/011,566, filed Feb. 13, 1996.
1 PIGMENT COMPOSITIONS Signed and Sealed this Twenty-fourth Day of August, 1999

*Attest:*

Q. TODD DICKINSON

*Attesting Officer*     *Acting Commissioner of Patents and Trademarks*